(12) United States Patent
Beverly et al.

(10) Patent No.: US 7,331,240 B2
(45) Date of Patent: Feb. 19, 2008

(54) APPARATUS AND METHOD FOR CONNECTING VEHICLE WHEEL SENSORS TO A CONTROLLER

(75) Inventors: James A. Beverly, Kalamazoo, MI (US); Kent E. Davison, Sturgis, MI (US); Gerard O. McCann, Kalamazoo, MI (US); Thomas F. Simma, Jr., Terre Haute, MI (US)

(73) Assignee: Dana Corporation, Toledo, OH (US)

( * ) Notice: Subject to any disclaimer, the term of this patent is extended or adjusted under 35 U.S.C. 154(b) by 470 days.

(21) Appl. No.: 11/106,332

(22) Filed: Apr. 14, 2005

(65) Prior Publication Data

US 2006/0230822 A1 Oct. 19, 2006

(51) Int. Cl.
*G01L 9/00* (2006.01)
(52) U.S. Cl. ............................................. 73/745
(58) Field of Classification Search ................. 73/745, 73/146.5, 146
See application file for complete search history.

(56) References Cited

U.S. PATENT DOCUMENTS

| | | |
|---|---|---|
| 4,086,532 A | 4/1978 | Aronson et al. |
| 4,660,146 A | 4/1987 | Kubo |
| 4,894,613 A | 1/1990 | Tsugawa |
| 5,184,069 A | 2/1993 | Adler et al. |
| 5,432,442 A | 7/1995 | Andersen |
| 5,487,595 A | 1/1996 | Wise et al. |
| 5,576,960 A | 11/1996 | Maeda |
| 5,926,016 A | 7/1999 | Pattantyus |
| 6,021,382 A | 2/2000 | Greenwell et al. |
| 6,124,787 A * | 9/2000 | Isakov et al. ............... 340/448 |
| 6,133,728 A | 10/2000 | Manlove et al. |
| 6,339,322 B1 | 1/2002 | Loreck et al. |
| 6,362,732 B1 * | 3/2002 | Konchin et al. ............. 340/446 |
| 6,442,502 B1 | 8/2002 | Lohberg et al. |
| 6,498,474 B1 | 12/2002 | Turner |
| 6,501,261 B2 | 12/2002 | Muth |

* cited by examiner

*Primary Examiner*—Jewel Thompson
(74) *Attorney, Agent, or Firm*—Marshall & Melhorn LLC

(57) ABSTRACT

The present invention relates to a vehicle wheel sensor apparatus and a method that determine if a vehicle wheel sensor is active or passive, while efficiently providing the necessary connectivity, power, and communication between the sensor and a controller, without requiring a change in controller hardware. For an active sensor, the apparatus provides power and receives speed signals, high frequency vibration or acceleration signals, or other analog signals. For a passive sensor, the apparatus receives speed signals.

10 Claims, 7 Drawing Sheets

APPARATUS AND METHOD FOR CONNECTING VEHICLE WHEEL SENSORS TO A CONTROLLER

FIELD OF THE INVENTION

The present invention relates to an apparatus and a method for connecting a vehicle wheel sensor to a controller. More particularly, the present invention relates to a vehicle wheel apparatus and a method that utilizes a controller to determine if a vehicle wheel sensor is active or passive, while efficiently providing the necessary connectivity, power, and communication between the vehicle wheel sensor and the controller.

BACKGROUND OF THE INVENTION

Those skilled in the art know that sensors are utilized on vehicles for determining vehicle operating characteristics, for example, vehicle wheel speed and vibration. Also, it is known that sensors may be characterized as active and passive, which require different controller hardware.

Active sensors often include electronic circuitry that requires external power to function. For example, an active speed sensor may utilize a "Hall Effect" element that senses the poles on a multi-pole magnet. As another example, a vibration/acceleration sensor generates signals that may originate from an accelerometer. Typically, the "Hall Effect" element and the accelerometer require power which originates from an external source. On the other hand, a passive sensor provides its own power. For example, a passive variable reluctance (VR) sensor, utilized as a speed sensor, may comprise a coil of wire wound around a pole piece of a magnet. When sensing a suitable exciter ring (a.k.a., "tone wheel"), this passive speed sensor provides the controller an approximately sinusoidal signal with a frequency that is proportional to the vehicle wheel speed. Thus, it is typical that hardware that is utilized to connect active sensors with a controller may not work to connect passive sensors with the controller. Also, different hardware is utilized to connect vibration/accelerometer signals with the controller that may not work to connect other active sensors and/or passive sensors with the controller.

Examples of relevant art, where vehicle wheel sensors are utilized in a vehicle, are as follows. U.S. Pat. No. 4,660,146 to Kubo discloses an anti-lock brake control system having wheel sensors at each wheel. Each wheel sensor is connected to a controller so that the controller can determine instantaneous wheel speed and instantaneous wheel acceleration, or deceleration, for each wheel.

U.S. Pat. No. 5,184,069 to Adler et al. teaches a wheel speed sensor system that generally discloses an active sensor or a passive sensor being connected to a system controller.

U.S. Pat. No. 5,576,960 to Maeda generally discloses a front wheel sensor and a rear wheel sensor of a motorcycle connected to an interface circuit and an anti-lock brake system (ABS) controlling unit.

U.S. Pat. No. 6,442,502 to Lohberg et al. provides a system for sensing the rotational speed of an incremental pulse generator by means of a sensor module. The sensor module is coupled magnetically to the encoder by way of an air gap. The sensor module is connected to an electronic control unit by way of a two-wire line. The two-wire line is used for the energy supply and the signal exchange. The electronic control unit may send control signals to the sensor module via the two-wire line. The control signals relate to the internal operations of the sensor module.

U.S. Pat. No. 6,339,322 to Loreck et al. teaches a sensor connected to an electronic control unit. The sensor itself has a controllable power source, which delivers a load-dependent current. Apparently, the sensed rotational speed of a wheel can be transmitted from the sensor to the electronic control unit (ECU) via two lines. A change between two predetermined current amplitudes transmits the sensor signal across one of the lines to the ECU. The frequency or duration of the change in current amplitude contains the data about the rotational speed being measured.

U.S. Pat. No. 6,133,728 to Manlove et al. provides for a variable reluctance magnetic pick-up sensor connected to a pick up coil via two lines. A differential voltage is produced in the lines by the sensor in response to rotation of a wheel.

Thus, active and passive vehicle wheel sensors, including those briefly described above, would benefit from an apparatus and a method that could directly connect both types of vehicle wheel sensors, while providing the necessary connectivity, power, and communication between the sensors and the controller through efficient and cost effective means.

SUMMARY OF THE INVENTION

The present invention relates to a vehicle wheel apparatus and a method that can determine if a vehicle wheel sensor is active or passive, and efficiently provide the necessary connectivity, power, and communication between the sensor and a controller, without requiring a change in controller hardware.

Further advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
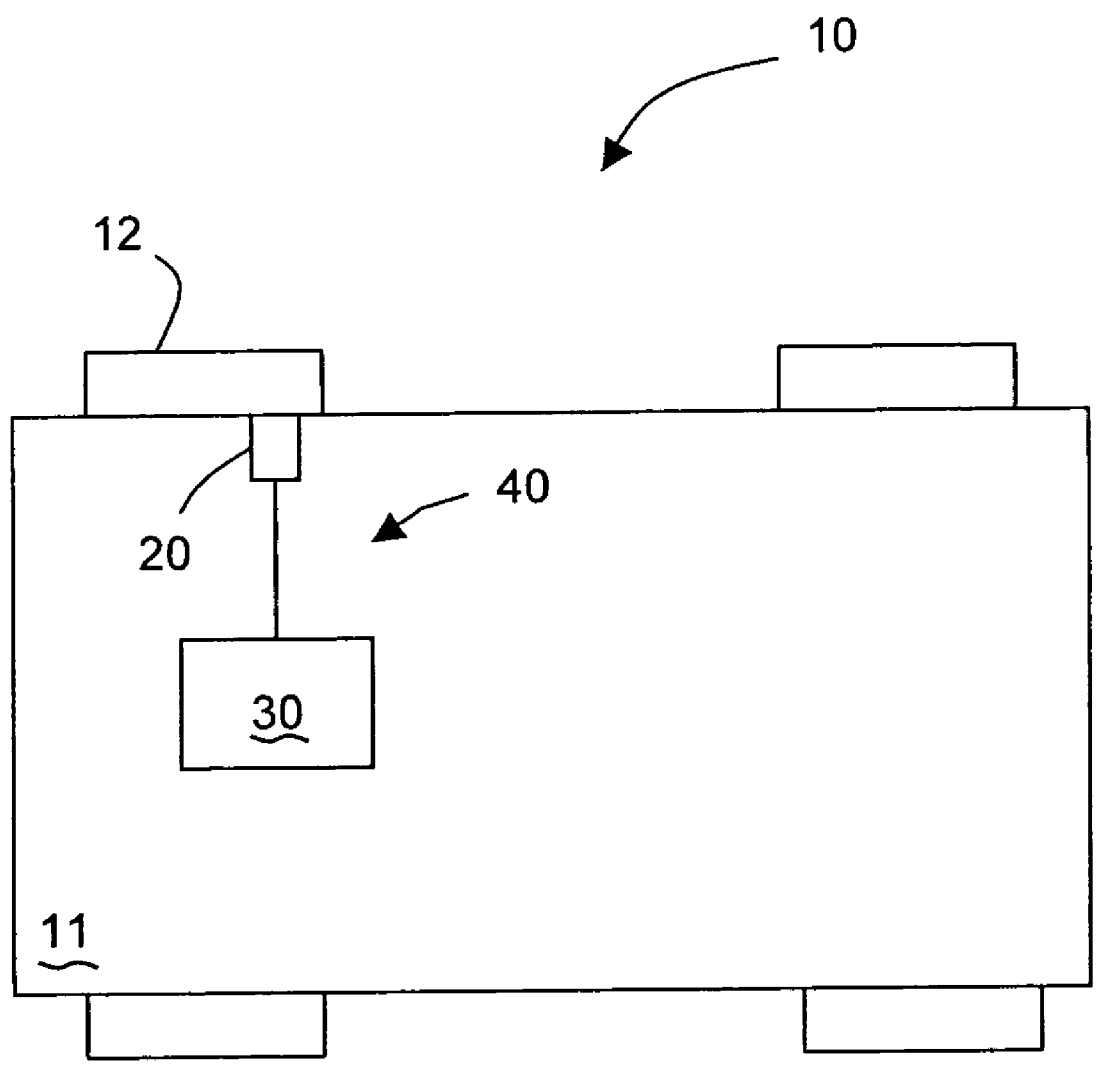
FIG. 1 is a diagrammatical illustration of a vehicle in accordance with the present invention.

FIG. 1 illustrates a vehicle 11 (for example, an automobile, a truck, a bus, a work vehicle, a trailer, a wagon, an airplane, or a motorcycle) having at least one vehicle wheel or vehicle wheel assembly 12 that is utilized to allow movement of the vehicle 11. The present invention comprises a vehicle wheel sensor apparatus 10 that can function with either an active or a passive vehicle wheel sensor 20, while utilizing an interface 40 that provides the necessary connectivity, power, and communication between the sensor 20 and a controller 30, which comprises a processor and a controller circuit, without requiring a change in the processor and/or the controller circuit.

In the present invention, an active sensor is defined to be a sensor that requires electrical power from an electrical power source. A passive sensor is defined to be a sensor that generates its own signal without requiring an external electrical power source.

Figure 2:
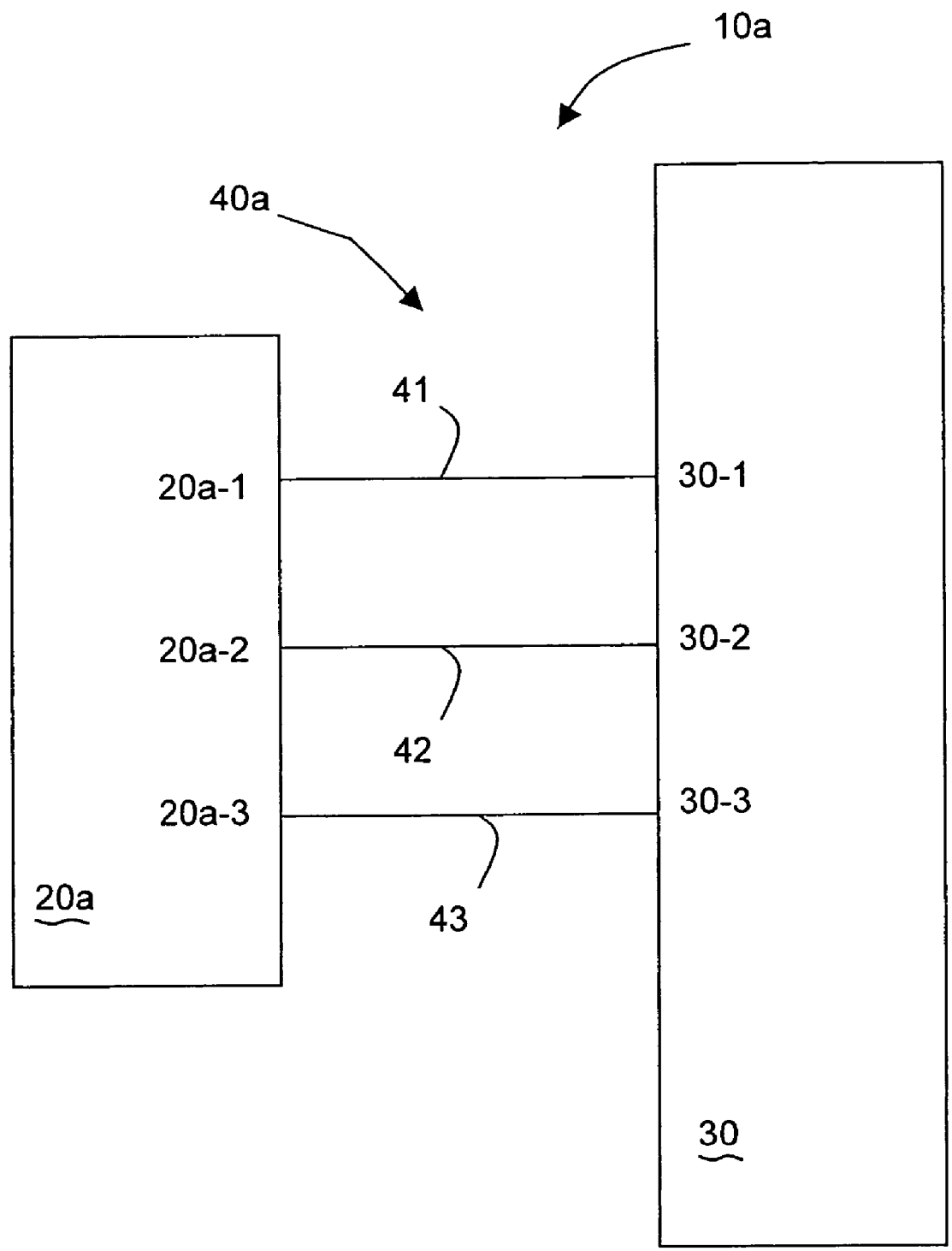
FIG. 2 is a block diagram of a first embodiment of an apparatus in accordance with the present invention.

In FIG. 2, an active sensor 20a is connected to the controller 30 by way of an interface 40a that comprises three nodes 41, 42, 43, which, respectively, provide the connecting means between active sensor connecting points 20a-1, 20a-2, 20a-3 and controller connecting points 30-1, 30-2, 30-3. In the present invention, the nodes 41, 42, 43 may comprise cables, wires, connectors, and/or pins.

Specifically, the first communication node 41 connects first active sensor connecting point 20a-1 to first controller connecting point 30-1. Correspondingly, the second communication node 42 connects second active sensor connecting point 20a-2 to second controller connecting point 30-2, and the signal return node 43 connects active sensor signal returning point 20a-3 to controller signal returning point 30-3.

Figure 3:
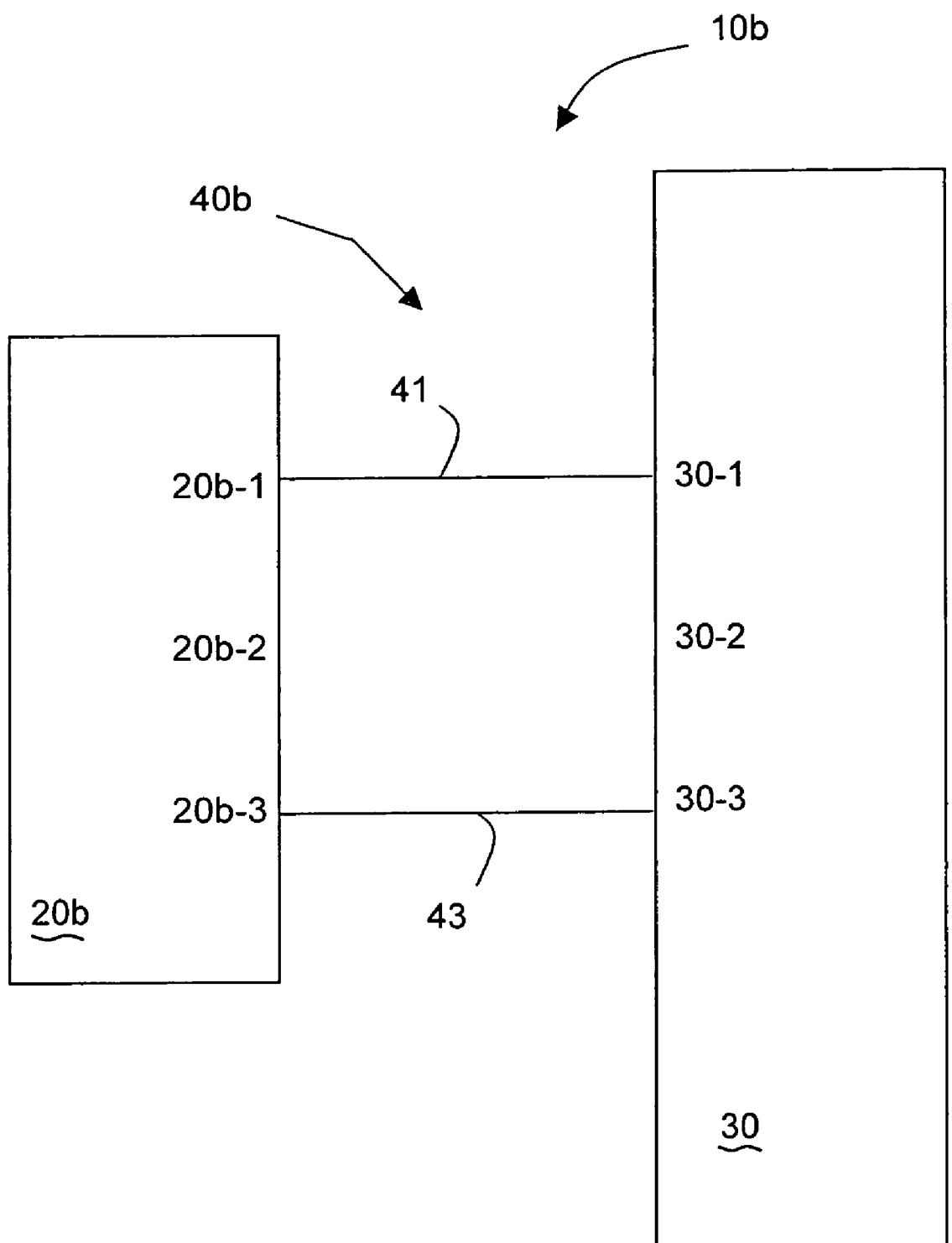
FIG. 3 is a block diagram of a second embodiment of an apparatus in accordance with the present invention.
Figure 4:
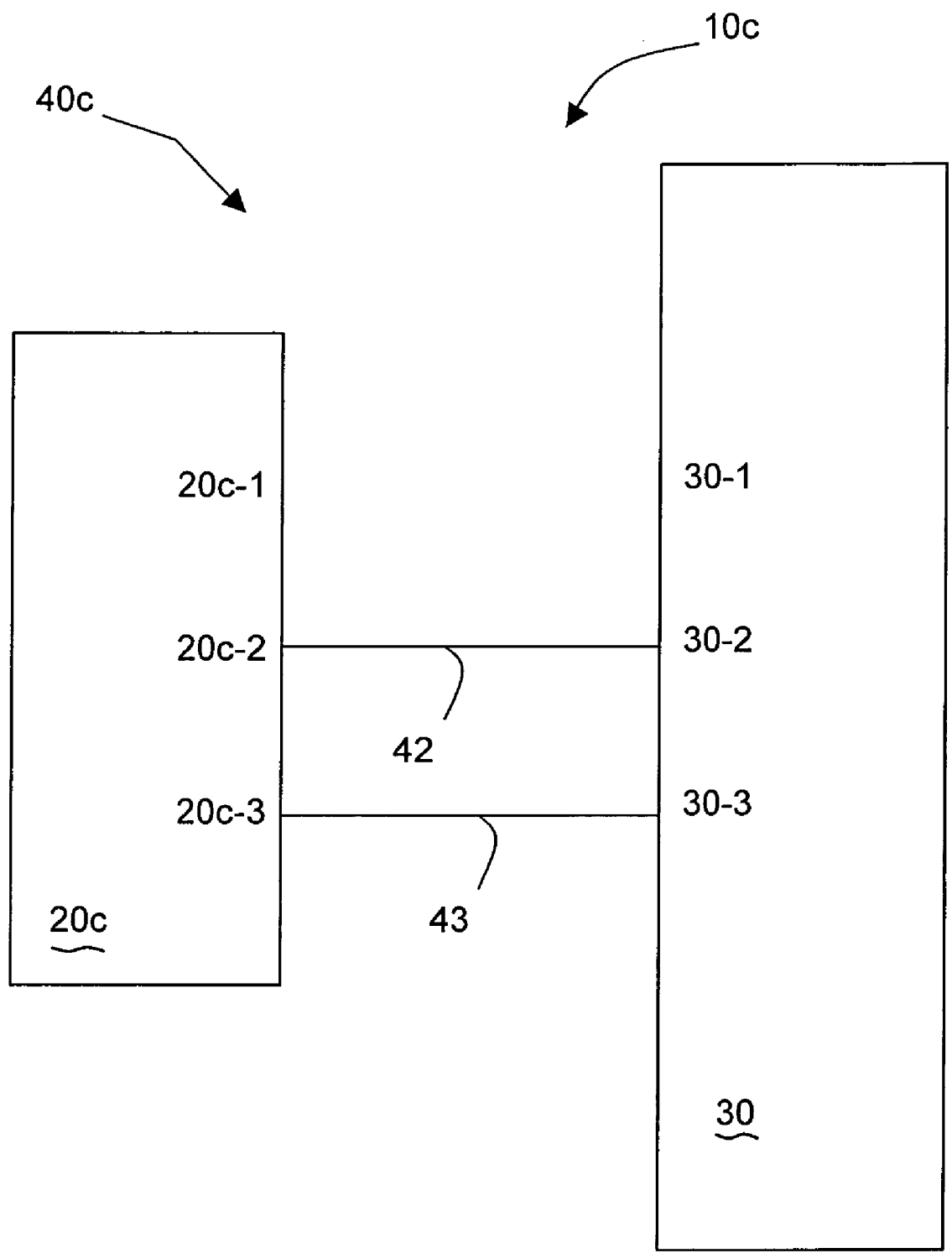
FIG. 4 is a block diagram of a third embodiment of an apparatus in accordance with the present invention.

As illustrated in FIGS. 3-4, it is within the spirit and scope of the instant invention that both of the communication nodes 41, 42 are not necessarily provided in vehicle wheel sensor apparatus 10b, 10c, which may be achieved, for example, by providing connectors/wires/cables between connecting points associated with 20b and 30, and 20c and 30 that lack one or the other of the communication nodes 41, 42. Note, however, that in FIGS. 2-4 the controller 30 remains the same without requiring a change in the processor and/or the controller circuit, which is a discovery of the instant invention.

Again referring to FIG. 2, since the active sensor 20a requires power to be delivered thereto, the node 41 communicates power from the controller 30 (or other source of electrical power via the communication node 41) to the active sensor 20a. The communication node 41 may also communicate vehicle wheel speed signals (and, possibly, other vehicle wheel data signals) from the active sensor 20a to the controller 30 (details of this communication will be discussed later in regard to FIG. 5). The communication node 42 communicates vibration signals, acceleration signals, or various analog signals from the active sensor 20a to the controller 30. As stated above, the signal return node 43 provides signal returning from the controller 30 to the active sensor 20a.

FIG. 3 illustrates an active sensor 20b and a vehicle wheel sensor apparatus 10b, which has an interface 40b. The interface 40b comprises the nodes 41 and 43, where power is communicated from the controller 30 (or other source of electrical power) to the active sensor 20b by way of active sensor connecting points 20b-1 and 20b-3, respectively, being connected to the controller connecting points 30-1 and 30-3. Also, the communication node 41 communicates vehicle wheel speed signals (and, possibly, other data signals) from the active sensor 20b to the controller 30 by way of the active sensor connecting point 20b-1 being connected to the controller connecting point 30-1.

FIG. 4 illustrates a passive sensor 20c and a vehicle wheel sensor apparatus 10c, which has an interface 40c. The controller 30 receives vehicle wheel speed signals from the passive sensor 20c on the communication node 42, which connects passive sensor connecting point 20c-2 to controller connecting point 30-2. The signal return node 43 connects a passive sensor signal returning point 20c-3 to the controller signal returning point 30-3.

Figure 5:
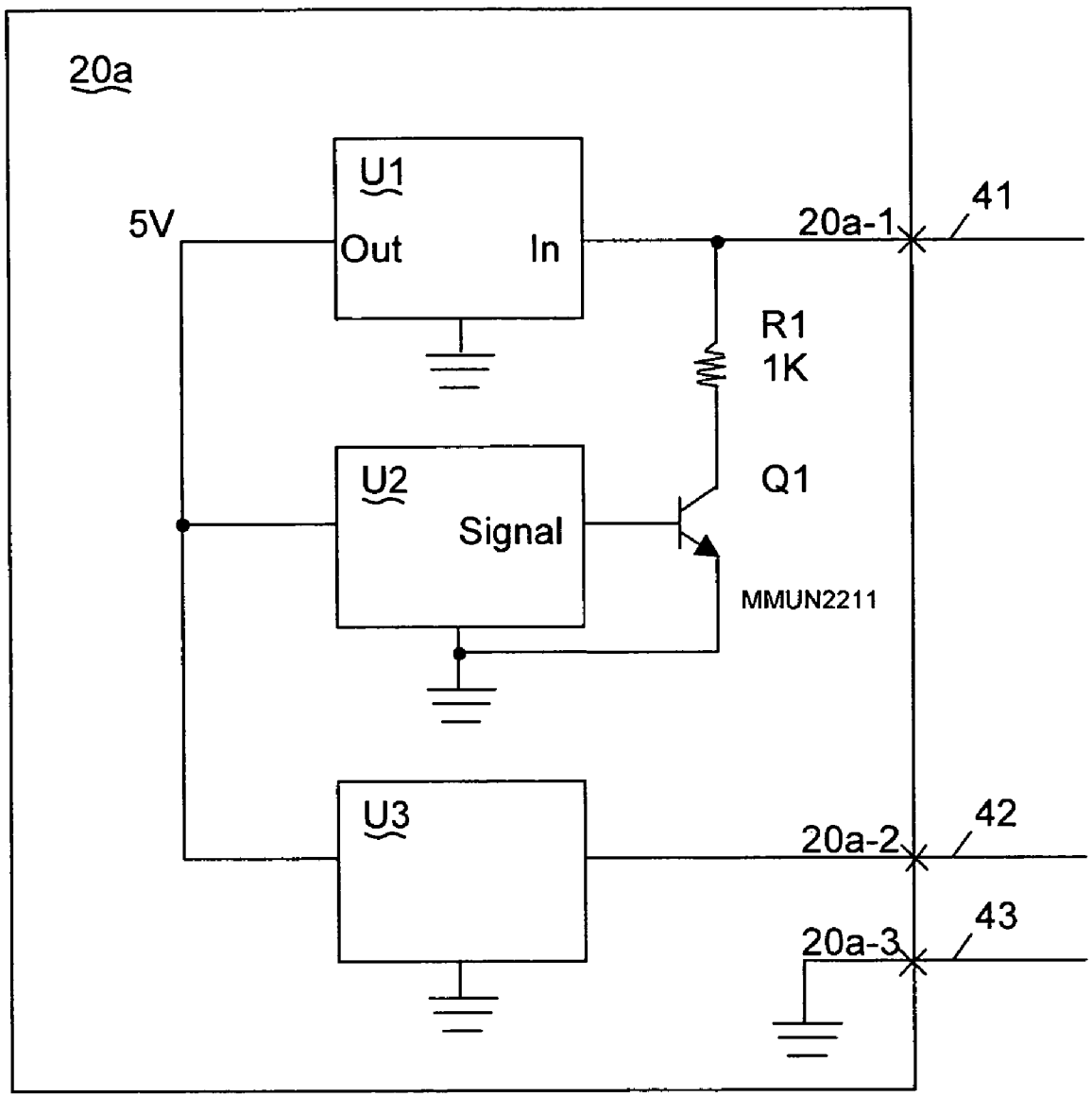
FIG. 5 is a functional block diagram of the embodiment of FIG. 2.

FIG. 5 illustrates an embodiment of the active sensor 20a of FIG. 2 utilizing a Hall Effect sensor U2, where power is provided from the controller 30 via the node 41 to U1-In on a 5 volt regulator U1. For this particular implementation, the incoming voltage on the node 41 is in the range of 6.0-6.5 volts positive with respect to the node 43 (which is the signal return for both the power and a data signal from U2). This incoming voltage is utilized at the input of the regulator U1, which then provides regulated 5V power from U1-Out to U2 and an accelerometer U3.

Thus, U1 serves to isolate the active sensor 20a from any voltage fluctuations in the incoming voltage supplied to U1-In by the controller 30. With a 6 volt input, there is provided adequate voltage "headroom" for the regulator U1 to still provide a steady 5 volt output to U2 and U3.

The Hall Effect sensor U2 generates a wheel speed signal that is transmitted from U2 to the controller 30 through a transistor Q1 (for example, MMUN2211) and a resistor R1, and then on the node 41. As already mentioned, the node 41 is also utilized to provide power to the active sensor 20a. This U2 speed signal consists of electrical current pulses with a frequency corresponding to a wheel speed. The current pulses are generated by the transistor Q1 (that is common in the art), which turns on and off in response to the signal output from U2-Signal. The transistor Q1 sinks current through R1 (for example, 1K ohms), when it is turned on, and sinks essentially zero current when it is turned off.

As can be seen from FIG. 5, the remainder of the active sensor 20a also consumes electrical current. Additionally, specific current sink circuits or current sinking resistors may be used to help to establish a floor electrical current during the periods that the transistor Q1 is turned off.

For example, it may be decided to utilize approximately 6 mA as a floor current, in the implementation shown, and assuming approximately 6 volts on the node 41, then when the transistor Q1 turns on, an upward step change of electrical current of approximately 6 mA (milliamps) occurs. Likewise when the transistor Q1 turns off, a downward step change of approximately 6 mA occurs. A current step value is determined approximately by the voltage on the node 41 (approximately 6 volts) divided by the resistance of R1 (1 K Ohm). Assuming a floor current of 6 mA, the two different current levels would then be approximately 6 mA and 12 mA. As already noted, the frequency of current pulses (a.k.a., steps) is typically proportional to wheel speed.

The present invention, however, is not limited by the choice of the regulator U1, Hall Effect sensor U2, accelerometer U3, or the transistor Q1, which may be conventional in the art, since the present invention can be used with any sensor of approximately the configuration of active sensor 20a. Likewise, other detailed components such as smoothing capacitors and additional resistors may be required depending on the exact devices chosen for U1, U2, and U3 and the overall design requirements for the active sensor 20a. In the present invention, implementation of any particular design uses standard circuit design techniques, which are familiar to those skilled in the art.

Figure 6:
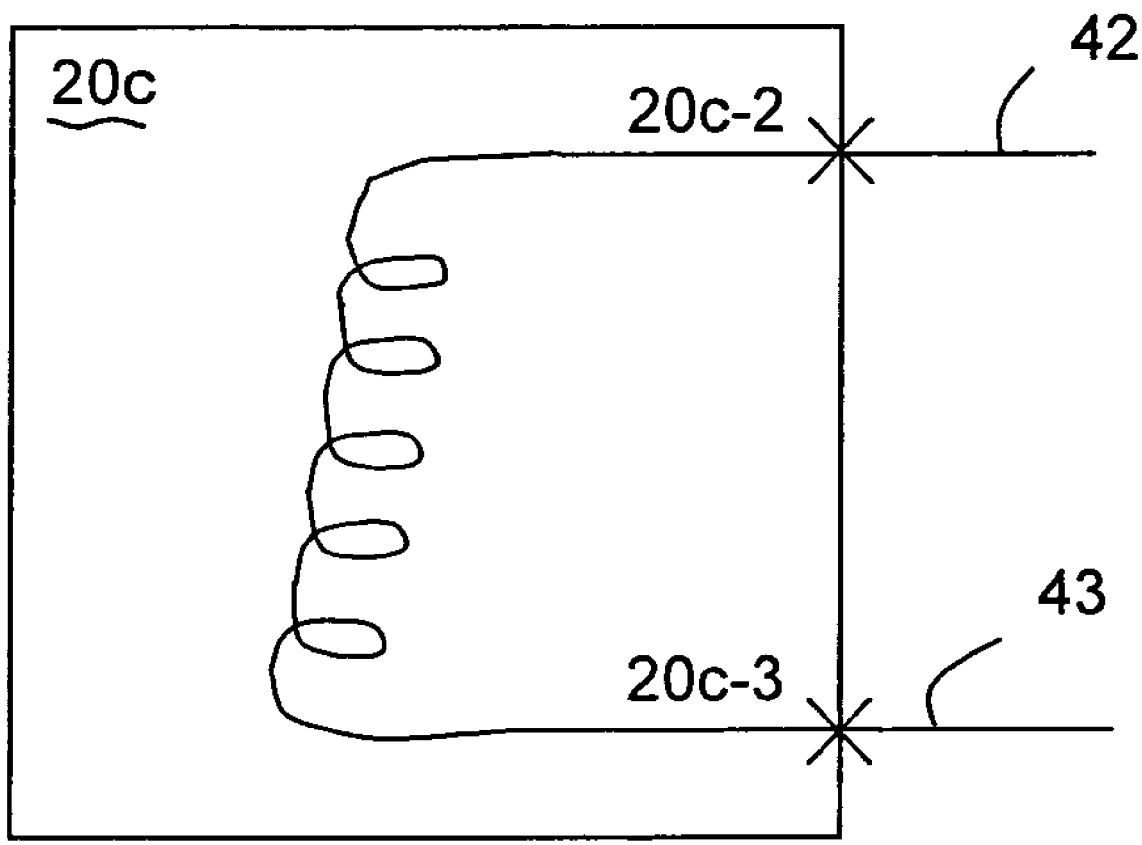
FIG. 6 is an electrical schematic of a passive variable reluctance sensor in accordance with the present invention.

FIG. 6 depicts a variable reluctance (VR) wheel speed sensor, which is an example of the passive sensor 20c. As already discussed, the passive sensor 20c may generate an approximately sinusoidal alternating voltage on the node 42, with respect to the node 43. The coils of the sensor 20c represent coils of wire wrapped around a pole piece (not shown) of a conventional wheel speed sensor.

Figure 7:
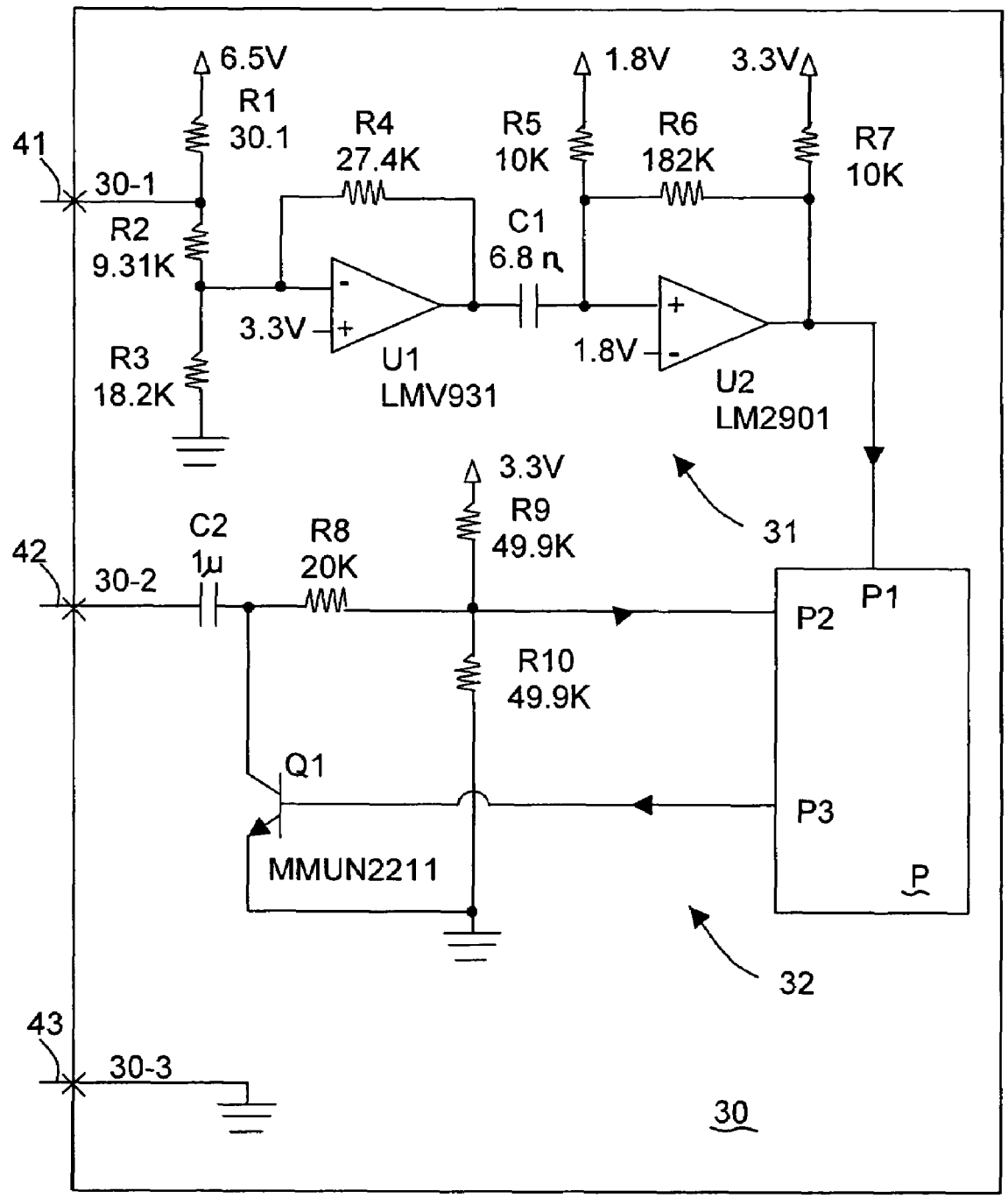
FIG. 7 is an electrical schematic of a controller circuit in accordance with the present invention.

FIG. 7 illustrates an embodiment of a first controller circuit 31 (which includes an active sensor wheel speed input on the node 41). Voltage "rails" of 1.8 volts, 3.3 volts and 6.5 volts are shown as being available in the first controller circuit 31. These are generated using conventional voltage regulator circuits. The 6.5 volt rail is further assumed to be switchable under the control of the processor P, for example, Texas Instruments TMS320CLF2406APZA, which may, however, be the anti-lock brake system (ABS) (not shown) processor of the vehicle 11.

As previously discussed, the node 41 provides power from the controller 30 to the sensors 20a, 20b and also receives the speed signal from the se sensors 20a, 20b at the connecting point 30-1. Assuming that either of the sensors 20a, 20b sinks either 6 mA or 12 mA of electrical current (corresponding to the 6 mA current step), then the voltage on the node 41 is either approximately 6.32 volts or approximately 6.14 volts and, as previously discussed, this provides adequate voltage for the sensors 20a, 20b. A voltage step at the bottom of R1 (30.1 ohms) in the first controller circuit 31 corresponding to a current step is then approximately 0.18 volts.

In accordance with principles known to those skilled in the art, the approximately 0.18 voltage step is amplified (and the base voltage of this incoming signal is also level shifted) by an inverting operational amplifier (U1, for example, LMV931) configuration that comprises U1, R2 (9.31K ohms), R3 (18.2K ohms), and R4 (27.4K ohms) of the first controller circuit 31. The incoming amplified voltage step signal is then AC coupled by a first coupling capacitor C1 (for example, in the range of 3-10 nano-farads, where 6.8 nano-farads is shown in FIG. 7) and, in effect, further amplified by a comparator (U2, for example, LM2901) circuit that comprises U2, R5 (10K ohms), R6 (182K ohms), and R7 (10K ohms).

The comparator circuit includes a hysteresis function determined largely by the relative values of R5 and R6. This function helps to reduce sensitivity to voltage noise on the node 41. The output of U2 is a 0 to 3.3 volt "square wave" signal (for example, vehicle wheel speed), which is presented to a processor P by way of a processor first input P1 that is the "capture" function on the processor P. The capture input P1 time stamps voltage edges of the square wave signal and makes these time stamps available for further processing in accordance with principles known to those skilled in the art.

It can be seen that signal return node 43 provides a signal return path so that the current steps, as noted above, also apply to current entering connecting point 30-3 on the controller. In an alternative embodiment, in accordance with principles know to those skilled in the art, it is within the spirit and scope of the present invention to have current sensing circuitry respond to the current steps entering 30-3 and present a corresponding "square wave" signal to input P1 on processor P. In such an embodiment the signal return connection to connecting point 30-3 in FIG. 7 would be through the stated current sensing circuitry.

In the lower portion of FIG. 7 there is illustrated a second controller circuit 32, which receives incoming analog signals (like those presented by sensors 20a, 20c) on the node 42, but does not provide any power out on the node 42. A second coupling capacitor C2 (for example, 1 microfarad) provides AC coupling for the incoming analog signals communicated on the node 42, where R8 (20K ohm), R9 (49.9K ohm), and R10 (49.9K ohm) provide voltage division and a base voltage level setting for the incoming analog signals that then is communicated to the processor P via the processor second input P2 (for the processor P to determine vehicle wheel acceleration, vibration, and other characteristics). During the time that it is desired to process incoming signals, a transistor Q1 (for example MMUN2211) which is under the control of a processor output P3, remains off.

Essentially, the incoming analog circuit 32 of the controller 30, associated with the node 42, passes any AC analog signal in an appropriate frequency range (for example, 3.5 cycles per second to 5 thousand cycles per second). The filter behavior at the low end of the frequency range is determined largely by the values chosen for C2, R8, R9 and R10 as will be understood by those skilled in the art. The behavior at the upper end of the frequency range would be determined largely by the values chosen for R8, R9, R10, and an additional capacitor (not shown) that would be connected in parallel with R10. However, because of the presence of C2, the incoming analog circuit 32 does not pass DC signals, which are not required either for the accelerometer signal from the active sensor 20a, or for the wheel speed signal from the passive sensor 20c. The controller incoming analog circuit 32 is suited to pass either of these two analog signals, but would not be well suited to pass the wheel speed signal from an active sensor, which, in the present invention, is directed to the first controller circuit 31 by way of the node 41.

It is a discovery of the instant invention to only connect the input of the passive wheel speed output 20c-2 to the controller 30 by way of the controller connecting point 30-2. In previous wheel speed sensing systems, which do not have any sensors that correspond to an accelerometer, it has been common practice to connect a passive wheel speed output to an input also suitable for interfacing with an active wheel speed sensor. This potentially adds cost and may cause the resulting circuit to be sub-optimal for interfacing with either type of sensor.

In addition to only connecting the input of the passive wheel speed output 20c-2 to the controller 30 by way of the controller connecting point 30-2, the present invention utilizes the interface 40 (i.e., the nodes 41, 42, 43 and the controller circuits 31, 32) to recognize the type (i.e., active wheel sensor, active analog sensor, and passive wheel sensor) of the sensor 20 that is connected to the controller 30. As noted earlier, the 6.5 volt rail of the controller 30 is switchable. Thus, on initial power up, and/or periodically when the wheel is stationary, the 6.5 volt rail can be switched on and off. As a result of this switching process, the timing of the corresponding voltage transitions on the output of U2 (i.e., the processor first input P1) will be different, depending on whether an active sensor is or is not connected.

Likewise for terminal 30-2, Q1 of the controller 30 can be switched on and off, by way of processor output P3, and then the corresponding output waveform presented at the processor second input P2 will be different, depending on whether or not a passive VR sensor (like sensor 20c as shown in FIG. 6) is present. It should be noted that the inductance of the sensor 20c is particularly influential in determining the characteristics of the processor second input P2.

Consequently, the processor then knows the type of sensor that is connected, or indeed if any sensor is connected. It should be noted that the arrangement of wiring harnesses 40 used with the present invention would ensure that if the passive sensor is used it would be connected to terminal 30-2 whereas if the active sensor is used then it would be connected to terminal 30-1.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle wheel sensor apparatus, comprising:
   a first node, a second node, and a signal return node;
   an active or a passive vehicle wheel sensor; and
   a controller;
   wherein the nodes connect the vehicle wheel sensor and the controller, and a vehicle wheel sensor apparatus determines if the vehicle wheel sensor is the active vehicle wheel sensor or the passive vehicle wheel sensor, without requiring a change in controller hardware.

2. The vehicle wheel sensor apparatus of claim 1, wherein if the vehicle wheel sensor has been determined to be the active sensor, the vehicle wheel sensor apparatus provides power to the active sensor and receives vehicle wheel speed signals from the active sensor by utilizing the first node and the signal return node, and if the active sensor transmits high frequency vibration, acceleration, or other analog signals, the vehicle wheel sensor apparatus receives the high frequency vibration, acceleration, or other analog signals from the active sensor by utilizing the second node and the signal return node.

3. The vehicle wheel sensor apparatus of claim 2, wherein the controller further comprises a processor that determines a speed of a vehicle wheel from the vehicle wheel speed signals, and determines vibration, acceleration, or other characteristics of the vehicle wheel from the vehicle wheel vibration, acceleration, or other analog signals.

4. The vehicle wheel sensor apparatus of claim 1, wherein if the vehicle wheel sensor has been determined to be the passive sensor, the vehicle wheel sensor apparatus receives vehicle wheel speed signals by utilizing only the second node and the signal return node.

5. The vehicle wheel sensor apparatus of claim 4, wherein the vehicle wheel speed signals are communicated to a processor for determining a speed of a vehicle wheel.

6. A vehicle having at least one vehicle wheel or vehicle wheel assembly, comprising:
   at least one vehicle wheel sensor apparatus having a first node, a second node, a signal return node, an active or a passive vehicle wheel sensor, and a controller;
   wherein the nodes connect the vehicle wheel sensor to the controller, and the vehicle wheel sensor apparatus determines if the vehicle wheel sensor is active or passive, without requiring a change in controller hardware.

7. A method of connecting an active or a passive vehicle wheel sensor to a controller that determines if the vehicle wheel sensor is active or passive, comprising:
   providing a controller that utilizes a first communication node and/or a second communication node, and a signal return node;
   providing an active vehicle wheel sensor or a passive vehicle wheel sensor;
   connecting the controller to the active vehicle wheel sensor or the passive vehicle wheel sensor; and
   utilizing the controller to determine if the vehicle wheel sensor is active or passive, without requiring a change in controller hardware.

8. The method of claim 7, wherein if the controller is connected to the active vehicle wheel sensor, the controller provides power to the active vehicle wheel sensor and receives vehicle wheel speed signals from the active vehicle wheel sensor by utilizing the first communication node and the signal return node.

9. The method of claim 8, wherein if the active sensor transmits high frequency vibration, acceleration, or other analog signals, the controller receives the high frequency vibration, acceleration, or other analog signals by utilizing the second communication node and the signal return node.

10. The method of claim 7, wherein if the controller is connected to the passive vehicle wheel sensor, the controller receives vehicle wheel speed signals by utilizing only the second communication node and the signal return node.

* * * * *